US010047486B2

(12) United States Patent
Denham et al.

(10) Patent No.: US 10,047,486 B2
(45) Date of Patent: Aug. 14, 2018

(54) PIPE COVER AND METHOD FOR COVERING AN END OF A PIPE

(71) Applicants: William Craig Denham, Maysville, KY (US); John Charles Clarke, Maysville, KY (US)

(72) Inventors: William Craig Denham, Maysville, KY (US); John Charles Clarke, Maysville, KY (US)

(*) Notice: Subject to any disclaimer, the term of this patent is extended or adjusted under 35 U.S.C. 154(b) by 0 days.

(21) Appl. No.: 15/498,747

(22) Filed: Apr. 27, 2017

(65) Prior Publication Data

US 2017/0314217 A1 Nov. 2, 2017

Related U.S. Application Data

(60) Provisional application No. 62/391,355, filed on Apr. 27, 2016.

(51) Int. Cl.
*E01F 5/00* (2006.01)
*F16L 1/06* (2006.01)

(52) U.S. Cl.
CPC ............... *E01F 5/005* (2013.01); *F16L 1/06* (2013.01)

(58) Field of Classification Search
CPC ............ E01F 5/005; F16L 25/065; F16L 1/06
USPC ...................... 405/125; 138/106, 107; 248/62
See application file for complete search history.

(56) References Cited

U.S. PATENT DOCUMENTS

| | | | | |
|---|---|---|---|---|
| 3,993,192 A | * | 11/1976 | Bunn | B65D 21/0233 138/103 |
| 4,092,036 A | * | 5/1978 | Sato | F16L 21/04 285/321 |
| 4,524,959 A | * | 6/1985 | Kubo | B23K 37/0533 269/156 |
| 4,723,871 A | * | 2/1988 | Roscoe | E01F 5/005 405/124 |
| 4,998,847 A | * | 3/1991 | Thurber | E01F 5/005 210/164 |
| 5,971,663 A | * | 10/1999 | Brothers | F16L 3/1091 138/107 |
| 6,203,245 B1 | * | 3/2001 | Harten | E01F 5/005 138/107 |
| 6,394,700 B1 | * | 5/2002 | Fish | E01F 5/00 138/96 R |
| D465,284 S | * | 11/2002 | Brown | D25/1 |
| 8,870,493 B2 | * | 10/2014 | Haire | E02B 7/20 137/527.6 |
| 2002/0076280 A1 | * | 6/2002 | Semotiuk | E01F 5/005 405/124 |
| 2002/0127061 A1 | * | 9/2002 | Hartman | E01F 5/005 405/125 |

(Continued)

*Primary Examiner* — Carib A Oquendo
(74) *Attorney, Agent, or Firm* — Witters & Associates; Steve Witters

(57) ABSTRACT

Technologies are described for a pipe cover and method of covering a pipe. The pipe cover comprises a cover having a first side, top, second side and an open bottom and is configured to receive an end portion of a pipe into the open bottom and between the first and second side. The first side, top, and second side are configured to extend beyond a terminal end of the pipe to be covered. A first clamping mechanism is on the first side and a second clamping mechanism is on the second side, configured and disposed to clamp the cover onto the end portion of the pipe to be covered and cover the terminal end of the pipe.

18 Claims, 6 Drawing Sheets

(56) References Cited

U.S. PATENT DOCUMENTS

2013/0020447 A1\* 1/2013 Heath .................... F16B 2/065
                                                                                         248/58

\* cited by examiner

PIPE COVER AND METHOD FOR COVERING AN END OF A PIPE

CROSS REFERENCE TO RELATED APPLICATIONS

This Non-provisional application claims priority to U.S. Provisional Patent Application No. 62/391,355 filed Apr. 27, 2016, the entire contents of which are hereby incorporated by reference.

FIELD OF THE DISCLOSURE

This invention generally relates to a pipe cover and method of covering an end portion of a pipe.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

A culvert is a structure that allows water to flow under a road, railroad, trail, or similar obstruction from one side to the other side. Culverts are typically embedded so as to be surrounded by soil. A culvert may be made from a pipe, reinforced concrete or other material. Culverts are commonly used both as cross-drains for ditch relief and to pass water under a road at natural drainage and stream crossings. A culvert may be a bridge-like structure designed to allow vehicle or pedestrian traffic to cross over the waterway while allowing adequate passage for the water. Culverts come in many sizes and shapes including round, elliptical, flat-bottomed, pear-shaped, and box-like constructions. Often, one or both ends of the culvert may be exposed. Exposure of the ends of the culvert, especially culvert pipes, may lead to damage of the exposed end portion of the culvert. Additionally, exposed end portions of culverts may negatively effect the aesthetics of the environment.

It is often desired to cover end portions of culverts.

SUMMARY

In at least one embodiment of the present disclosure, a pipe cover is provided. The pipe cover comprises a cover having a first side, top, second side and an open bottom. The cover is configured to receive an end portion of a pipe into the open bottom and between the first and second side. The first side, top, and second side are configured and disposed to extend beyond a terminal end of the pipe to be covered, upon receipt of the pipe in the open bottom. A first clamping mechanism is on the first side and a second clamping mechanism is on the second side. The first and second clamping mechanisms are configured and disposed to clamp the cover onto the end portion of the pipe to be covered and cover the terminal end of the pipe.

In at least one other embodiment of the present disclosure, a method for covering an end of a pipe is provided. The method comprises placing a pipe cover over a terminal end of a pipe, the pipe cover having a first side, a top, a second side and an open bottom. Covering a top and portions of sides of the terminal end of the pipe, with the first side, the top, and the second side of the pipe cover, and leaving a lower portion of the pipe uncovered. Clamping the first and the second sides of the pipe cover onto the pipe.

BRIEF DESCRIPTIONS OF THE DRAWINGS

The foregoing and other features of this disclosure will become more fully apparent from the following description and appended claims, taken in conjunction with the accompanying drawings and examples. Understanding that these drawings depict only several embodiments in accordance with the disclosure and are, therefore, not to be considered limiting of its scope, the disclosure will be described with additional specificity and detail through use of the following figures, which are idealized, are not to scale and are intended to be merely illustrative of aspects of the present disclosure and non-limiting. In the drawings, like elements are depicted by like reference numerals. The drawings are briefly described as follows:

DETAILED DESCRIPTION

Figure 1:
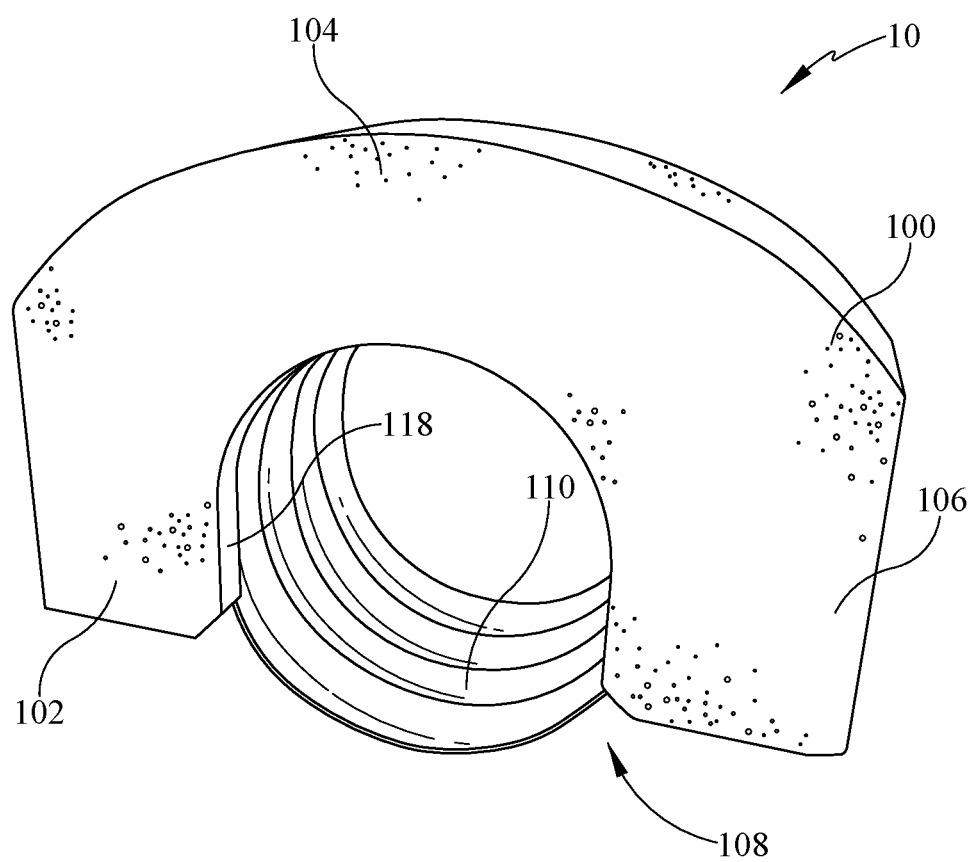
FIG. 1 is a frontal perspective view of a pipe cover of the present disclosure, covering an end portion of a culvert pipe.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In at least one illustrative example of the pipe cover of the present disclosure, the pipe cover is configured to cover an end of a culvert pipe. The culvert pipe cover may have an open bottom and may be lowered, or otherwise placed, on an end of a culvert pipe. Two sides may extend down sides of the pipe and the sides of the culvert pipe cover may be shorter than a diameter of the pipe. This configuration may permit the culvert pipe cover to rest on the culvert pipe or be suspended above the ground, with the pipe.

The sides of the culvert pipe cover may have clamping mechanisms in its two sides for clamping onto the pipe. The top and side clamping mechanisms may hold the culvert pipe cover onto the end of the pipe. A portion of the culvert pipe cover may extend beyond the exit of the culvert pipe.

The culvert pipe cover may have a lip, or inwardly extending portion, extending from its terminal end. The lip or inwardly extending portion may cover a portion of the exit of the culvert pipe and shield a portion of the culvert pipe exit from view.

Figure 2:
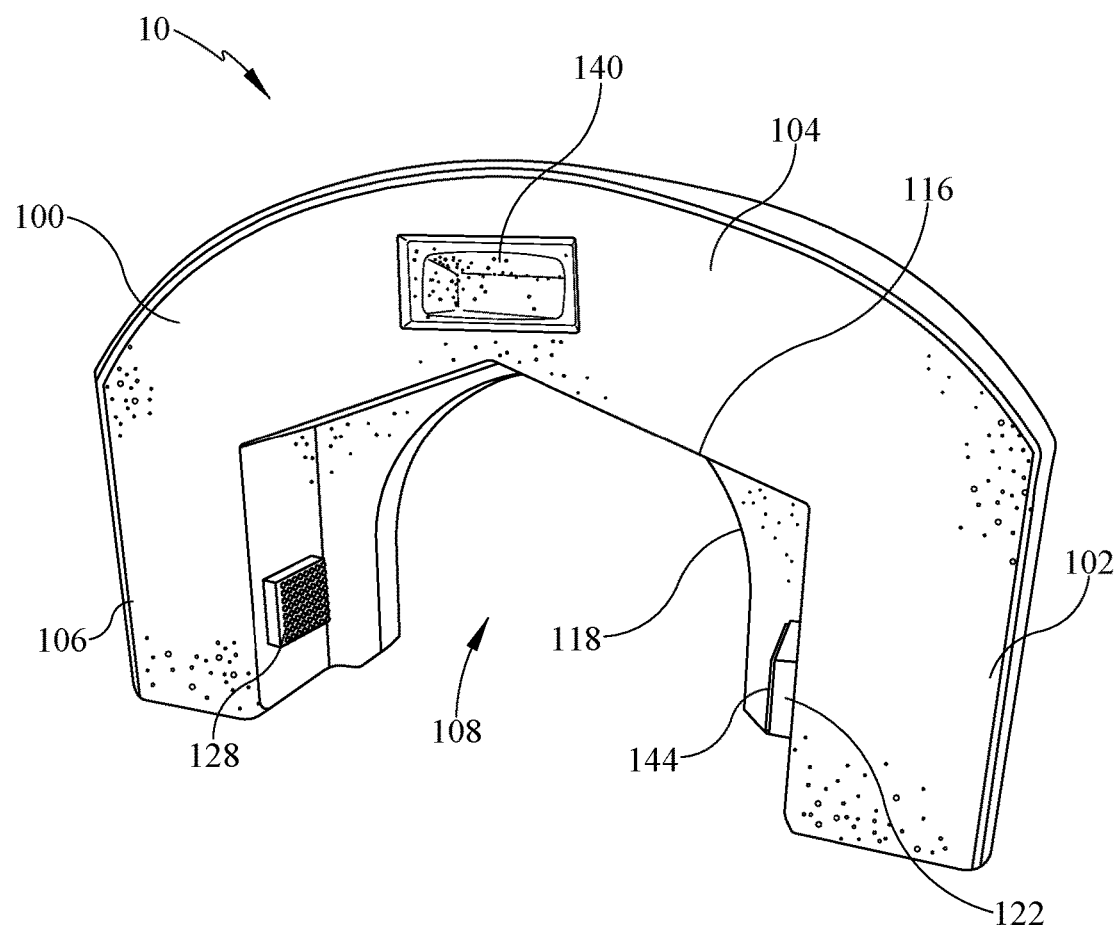
FIG. 2 is a reward perspective view of the pipe cover shown in FIG. 1.

FIG. 1 is a frontal perspective view of pipe cover 10 and FIG. 2 is a reward perspective view of the pipe cover 10. pipe cover 10 has cover 100 and clamping mechanisms 112 and 114. Cover 100 may have a first side 102, top 104, second side 106, and an open bottom 108. In FIG. 1, cover 100 has received an end portion of pipe 110 into open bottom 108 and between first side 102 and second side 106. First side 102, top 104, and second side 106 axially extend beyond a terminal end of pipe 110, upon receipt of pipe 110 in open bottom 108.

A first clamping mechanism 112 is on first side 102 and a second clamping mechanism 114 is on second side 106. First and second clamping mechanisms, 112 and 114, are configured and disposed to clamp cover 100 onto an end portion of pipe 110 and cover the terminal end of pipe 110.

First side, top, and second side, of pipe cover 100, may have a first inner perimeter 116 and a second inner perimeter 118. First inner perimeter 116 may have a dimension greater than a diameter of pipe 110 and be configured to receive the end portion of pipe 110. Second inner perimeter 118 may be less than the first inner perimeter 118. In at least one embodiment, second inner perimeter 118 is less than the covered outer perimeter of pipe 110. For example, first side 102, top 104, and second side 106 may extend inward beyond the terminal end of pipe 110, hiding the portion of the covered terminal end of pipe 110 from view, as shown in FIG. 1. Otherwise stated, cover 100 may have a lip configured to extend inward beyond the wall of the pipe. This lip may hide the exit of the pipe from view.

Hand hold 140 may provide pipe cover 10 with a method of installation. For example, an installer may use one hand to insert fingers into hand hold 140 and grasp the inwardly extending portion, or second perimeter 118, with the other hand, thus holding top 104. Upon holding top 104, pipe cover 100 may be lifted and set onto pipe 110.

Figure 3:
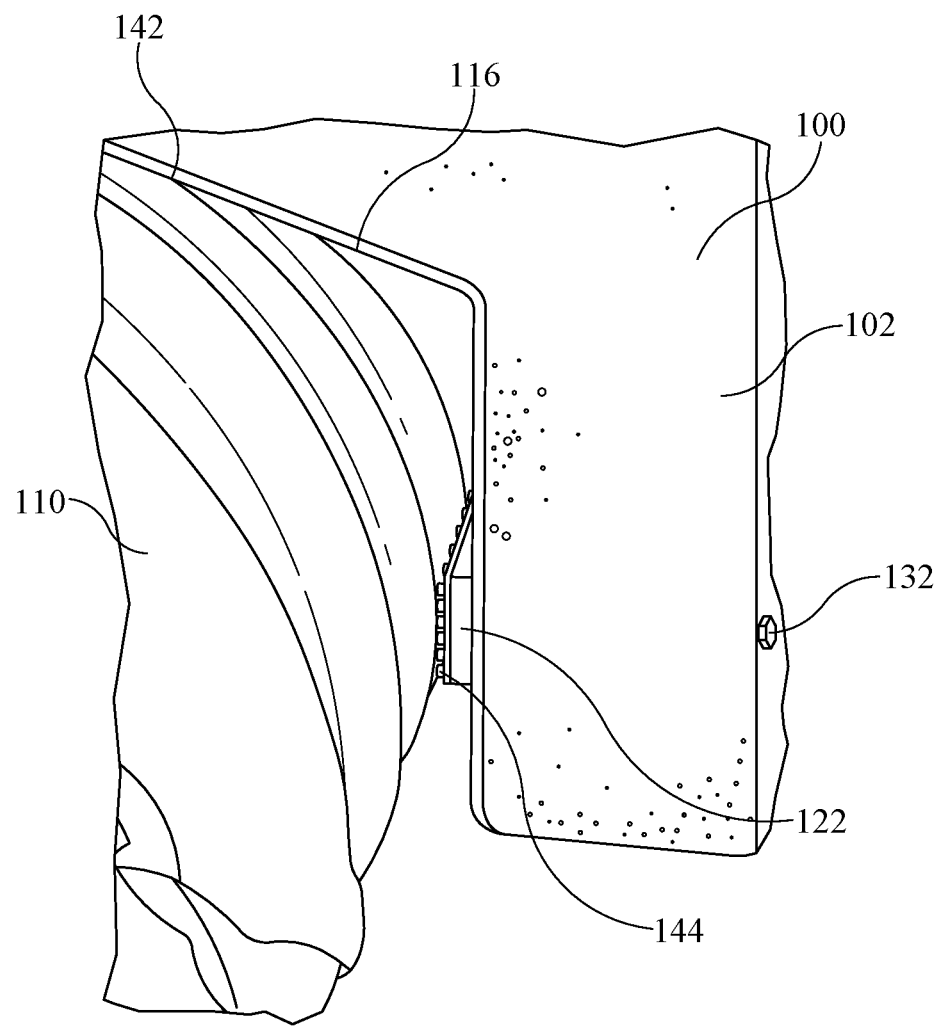
FIG. 3 is a perspective view of a portion of the pipe cover shown in FIG. 1, showing cooperation of the pipe cover with an end portion of a culvert pipe.
Figure 4:
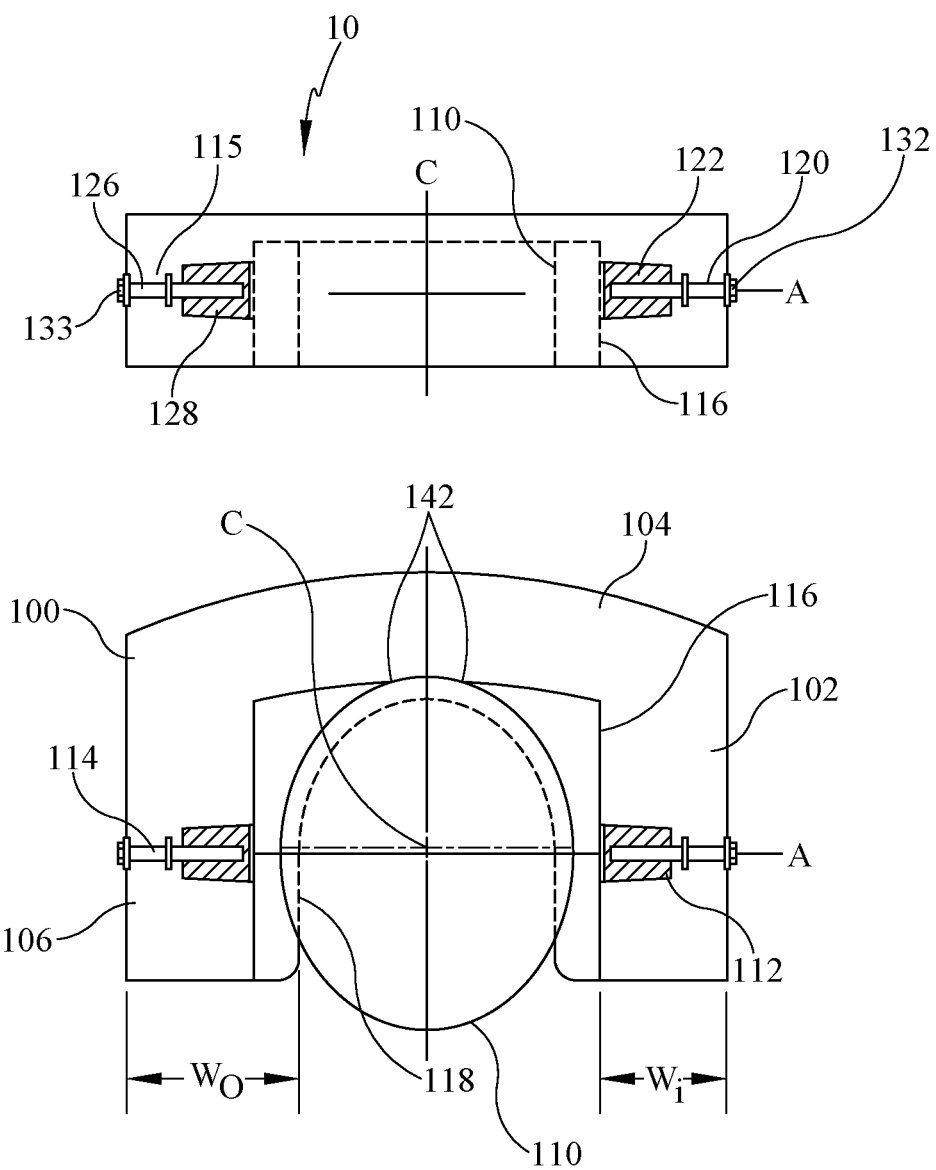
FIG. 4 shows cross-sectional views of the pipe cover shown in FIG. 1, showing cooperation of the pipe cover with an end portion of a pipe.

FIG. 3 is a perspective view of an end portion of pipe 110 covered with cover 100. FIG. 4 shows cross-sectional views of pipe cover 10 covering pipe 110. FIGS. 3 and 4 show the cooperation of pipe cover 10 with an end portion of pipe 110. pipe cover 10 has first clamping mechanism 112 with a first clamping control 120 and a first clamping block 122 disposed with first side 102. pipe cover 10 has second clamping mechanism 114 with a second clamping control 126 and a second clamping block 128 disposed with second side 106. Clamping controls 120 and 126 may be configured to move clamping blocks 122 and 128, respectively, toward each other and clamp onto an end portion of pipe 110.

First clamping control 120 may be accessible from an outer surface of first side 102 and second clamping control 126 may be accessible from an outer surface of second side 106. For example, first clamping control 120 may have head 232 accessible from first side 102. Rotation of head 232 may activate first clamping control 120 and move first clamping block 122 toward pipe 110. First clamping control 120, first clamping block 122, second clamping control 126, and second clamping block may all have the same longitudinal axis. Alternatively, first clamping control 120 and first clamping block 122 may have a different longitudinal axis than a longitudinal axis of second clamping control 126 and second clamping block. For example, first and second clamping controls 120 and 126 may be angled upward to force pipe 110 against top 104.

A length of an inner surface of first side 102 and a length of the inner surface of the second side 106 may be equal to each other and may be less than a diameter of pipe 110. For example, cover 100 may be configured to have top 104 rest on pipe 110 and hold sides 102 and 106 off of the ground.

First clamping mechanism 112 and second mechanism 114 may be configured and disposed to clamp pipe 110 below a center point "C" of pipe 110. For example, first and second clamping mechanisms 112 and 114 may have a longitudinal axis "A" positioned below the center point "C" of pipe 110. In this example, clamping pipe 110, with clamping mechanisms 112 and 114, may provide additional force, in addition to gravitational force, of top 104 against pipe 110. In at least one embodiment, an inner surface of top 104 is non-planar, curved, or angular. A non-planar or angular inner surface of top 104 may provide a plurality of contact areas 142, between top 104 and pipe 110. For example, bumps or other features on an inner surface of top 104 may increase friction forces holding pipe cover 10 on pipe 110.

Figure 5:
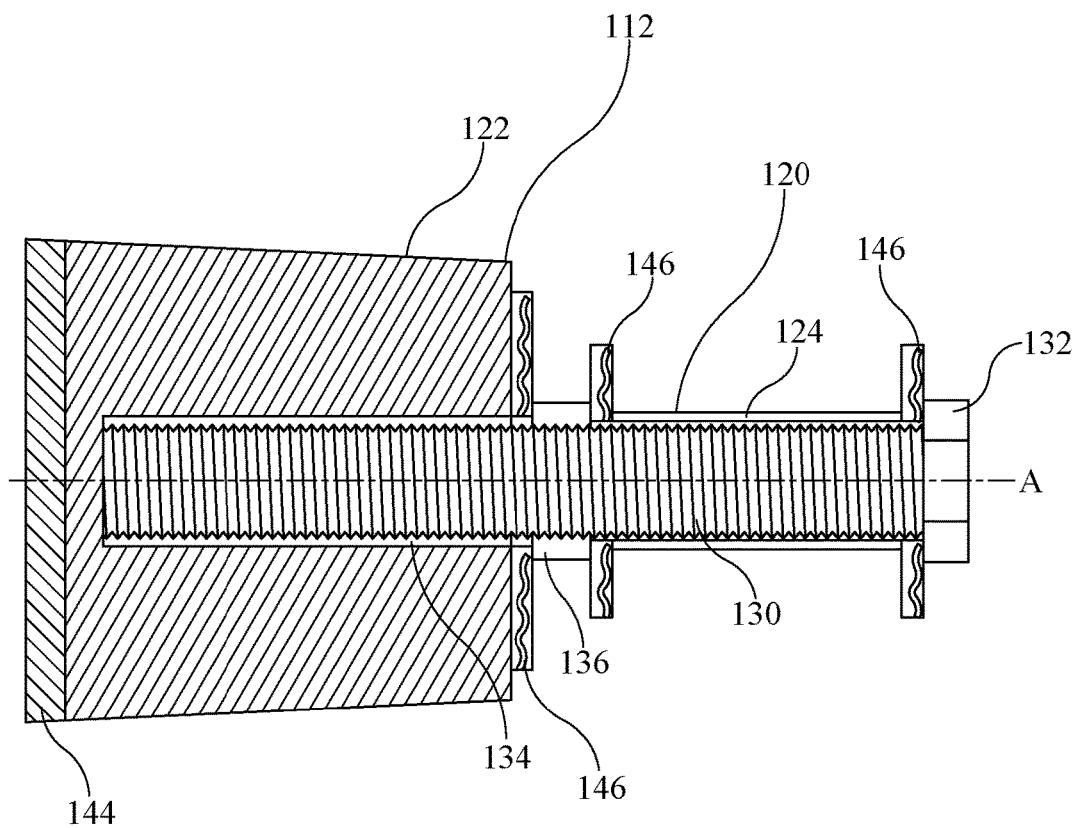
FIG. 5 is a cross-sectional view of a clamping mechanism that may be incorporated with the pipe cover shown in FIG. 1.

FIG. 5 shows a cross-sectional view of clamping mechanism 112 that may be incorporated with the pipe cover 10. For example, first and second clamping controls 120 and 126 may each comprise a threaded bolt 130 extending through apertures 115 in sides 102 and 106 with a head 132 and 133 accessible from the outer surfaces of the sides. First and the second clamping blocks 122 and 128 may each comprise a threaded inner portion 134 configured to receive a threaded bolt 130 and move the clamping blocks toward each other upon rotation of heads 132 and/or 133 of threaded bolts 130.

Clamping mechanisms 112 and 114 may each have a stop 136 on their threaded bolt 130 configured to contact cover 100, or washer 146, and stop movement of threaded bolts 130 out of the apertures 115 in sides 102 and 106. Sleeves 124 may surround portions of threaded bolts 130 extending through sides 102 and 106, through apertures 115, and protect the threads from contacting cover 100. One or more washers 246 and/or supports 247 may be disposed with clamping mechanisms 112 and 116 to provide support of the clamping mechanisms with their clamping block 122 and/or sides 102 and 106.

Figure 6:
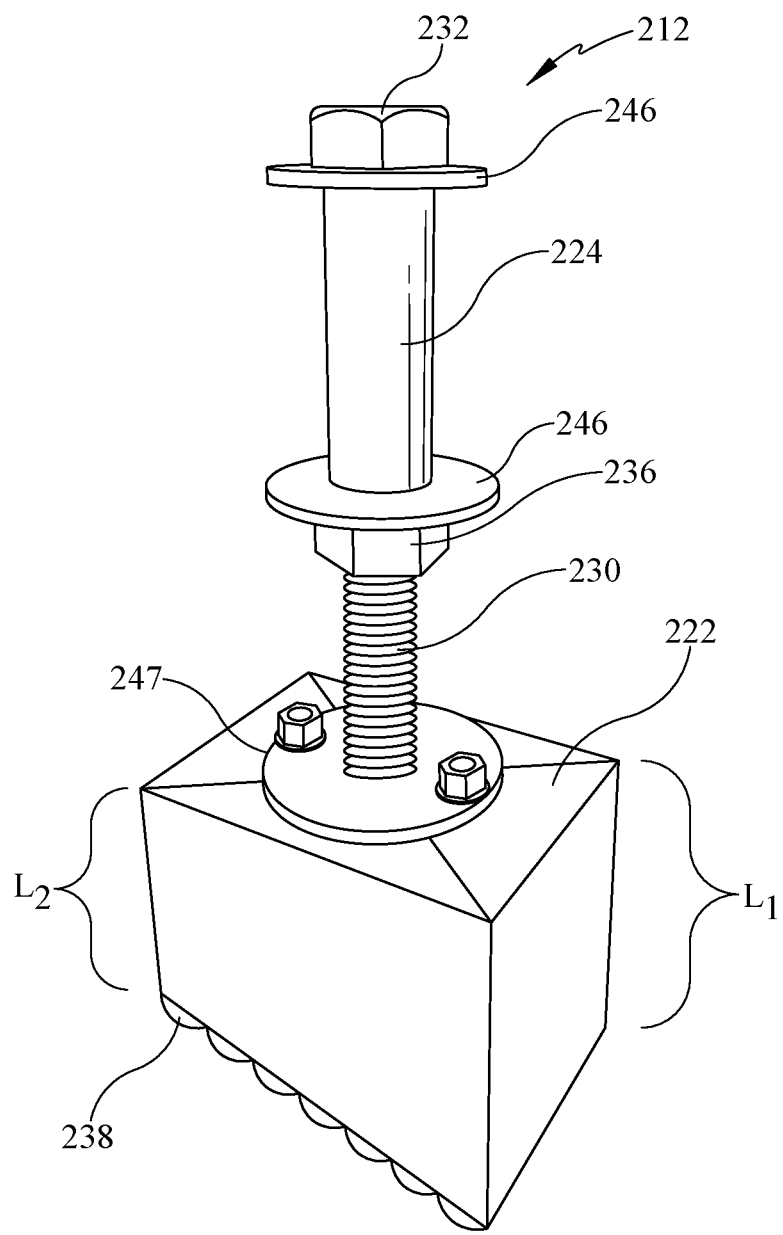
FIG. 6 shows another embodiment of a clamping mechanism of the present disclosure.

Claiming block 122 may have angled side surfaces, as shown in FIG. 5. Alternatively, the side surfaces may be parallel as shown in FIG. 6. Angled side surfaces of clamping block 122 may provide pipe cover 10 with spacing between clamping block 122 and cover 100 upon activation of clamping control 120, or extension of clamping block 122 toward pipe 110. For example, sidewalls 102 and 104 may have angular receptacles therein for holding clamping blocks 122 and 128, as shown in FIG. 4. Angled side surfaces of the clamping blocks, and like angled receptacles in the sides, may provide for tolerance or space for expansion of the clamping blocks when extended toward the pipe or activated.

FIG. 6 shows another embodiment of a clamping mechanism, clamping mechanism 212, of the present disclosure. Clamping mechanism 212 that may be incorporated with the pipe cover 10. Clamping mechanism 212 may comprise a threaded bolt 230 extending through apertures in sides 102 and 106 with a head 232 accessible from the outer surfaces of the sides. Clamping block 222 may comprise a threaded inner portion configured to receive threaded bolt 230 and move it toward pipe 110 upon rotation of head 232. Clamping mechanism 212 may have a stop 236 on threaded bolt 230 configured stop movement of threaded bolt 230 out of an aperture in sides 102 and 106. Sleeve 224 may surround a portion of threaded bolt 230 that may extend through side 102 or 106 and protect the threads from contacting cover 100. One or more washers 246 and/or supports 247 may be disposed with clamping mechanisms 212 to provide support of clamping mechanism 212 with their clamping block 222 and/or sides 102 and 106.

Clamping block 222 may have a non-planar surface 138, or friction pad, configured to increase a friction force with a pipe upon clamping. Clamping block 222 may have an angled end configured and disposed to contact the pipe being covered, angled with respect to the pipe. For example, clamping block 222 may have a first side length of L1 and a second side length of L2, wherein L1 is greater than L2. The disposition of L1 in the side of cover 100 to contact the pipe below its centerline may cause the pipe to become forced toward the top of cover 100. Such an angled configuration and disposition of clamping block 222 may increase the holding friction force of the clamping blocks and the top of the cover, with the pipe being covered.

A method for covering an end of a pipe is presently provided. An end or end portion of a pipe may be covered by placing a pipe cover over a terminal end of a pipe. The pipe cover may have a first side, a top, a second side and an open bottom. The placing of the pipe cover over the terminal end of the pipe may cover a top and portions of sides of the terminal end of the pipe, with the first side, the top, and the second side of the pipe cover. The placing of the pipe cover over a terminal end of the pipe may comprise inserting fingers into a hand-hold, or recess, in the top of the pipe cover. A lower portion of the pipe may remain uncovered. Clamping of the first and the second sides of the pipe cover onto the pipe may hold the pipe cover on the pipe. The pipe cover may be suspended on the pipe with the top of the pipe cover. Suspending of the pipe cover on the pipe may be accomplished by having sides of the pipe cover shorter than the diameter of the pipe being covered. An uncovered lower portion of the pipe being covered, portion of the pipe extending below the sides of the pipe cover, may be backfilled with soil, sand, gravel, or other backfill material The clamping of the sides of the pipe cover onto the pipe may comprise clamping the pipe below the center of the pipe. The pipe cover may be held on the end of the pipe with at least one non-planar friction surface. For example, the clamps and/or top surface of the pipe cover may have friction surfaces such as a rough, bumpy, or non-planar surface. The pipe cover may extend inward around the exit of the pipe, and thus covering a portion of the exit of the pipe. Clamping of the first and the second sides of the pipe cover onto the pipe may comprise activating clamping controls on the first and second sides of the pipe cover. For example, activating clamping controls may comprise rotating a bolt head on the first and second sides of the pipe cover.

In at least one illustrative example of the present disclosure, a culvert pipe cover is provided. A culvert pipe cover may be a landscaping product for culvert pipes, improving the aesthetics of the culvert pipe. Akin to headwalls for culvert pipes, the culvert pipe cover may be installed at the end of culvert pipes to retain earth or stone backfill at the end of the pipe and to protect the pipe. But unlike headwalls that completely encircle the pipe, the culvert pipe cover encircles only the top and sides, or portions of the sides, of the culvert pipe. Subsequently, no foundation may be required, allowing the culvert pipe cover to be lighter and much easier to install than a headwall.

Without a foundation, the culvert pipe cover depends on the pipe itself for stability. A clamping mechanism built into culvert pipe cover may fix the pipe cover securely to the pipe.

The walls of the culvert pipe cover may be made of precast, reinforced concrete, but other materials that may form similar shapes may be used, like plastic or fiberglass. The clamping mechanism may comprise wooden blocks, coupling nuts, washers, and bolts, but other materials may be used, like plastic, may also be used. The pipe cover may be sized to fit a variety of sizes, or ranges of sizes, of pipes. For example, the pipe cover may be configured to fit 10 in.-14 in., 13 in.-17 in., or 16 in.-20 in. outside diameter pipes. However, different sizes of the pipe cover may be made to fit different sized pipes or ranges of sized pipes.

Conventional headwalls of the prior art encircle the entire circumference of pipe, requiring excavation beneath culvert pipe before installation. The presently disclosed culvert pipe cover may have an open bottom or be semi-circular in shape, resting on top of the culvert pipe and covering sides, or portions of sides, of the pipe. This may negate the need for excavation beneath pipe for installation of the culvert pipe cover. To install on an existing pipe, only top and sides of pipe may need be exposed before installation.

Conventional headwalls are supported by ground adjacent to and beneath the pipe, the ground serving as foundational support. The presently disclosed culvert pipe cover may be supported by the pipe itself, allowing easy installation by simply placing it on top of the exposed pipe end. Since the cover may not be supported by adjacent ground, a built-in clamping mechanism may be incorporated, allowing culvert pipe cover to be easily clamped to the pipe.

Conventional headwalls fit a narrow range of pipe sizes because of the complete circle of the wall, which must approximately match the culvert pipe diameter. The presently disclosed culvert pipe cover may fit a range of pipe sizes. The built-in clamping mechanism may extend and retract a distance, allowing the culvert cover to be clamped onto a range of pipe sizes. For example, each clamping mechanism may extend and retract about two inches on each side, providing about a four inch pipe size range for fitting.

Conventional headwalls of the prior art, if struck by a vehicle (lawnmower or automobile for example) and damaged, may require extensive work to replace, since concrete patching, complete replacement, or an amount of excavation may be required. The presently disclosed culvert pipe cover, if struck by a vehicle may simply "pop-off" the culvert pipe and may either be easily reattached or replaced with a new culvert pipe cover, which would require minimal excavation, if any. Also, if a conventional headwall were struck by vehicle, it presents a fixed barrier to vehicle, likely causing more damage to the vehicle and potential injury to the occupant. The presently disclosed culvert pipe cover may present a more flexible barrier, less likely to cause vehicle damage or injury.

Conventional headwalls are designed to fit flush with end of pipe. The presently disclosed culvert pipe cover may have a front face lip that covers an exposed end, or exit, of the culvert pipe peripherally on the top and sides. The lip may configure the culvert pipe cover to fit a range of pipe sizes without showing a gap between the inside wall of the culvert pipe cover and outside surface of the pipe. Also, the lip may hide pre-existing damage (smashed in portions) of top and sides of the culvert pipe.

Conventional headwalls are heavy, requiring machinery to lift and maneuver. The presently disclosed culvert pipe cover may be smaller and lightweight, and may be able to be carried by a single person. The presently disclosed culvert pipe cover may be picked up with two points of contact, one for each hand. For example, the front lip and a void may be provided along its back surface at the top for inserting fingers, may provide grasping areas. With manageable weight and two convenient points of contact for lifting, the presently disclosed culvert pipe cover may be easily moved for transportation and placed for installation. The lip and void may allow the fingers to be clear of the pipe when installing, preventing potential smash injury of fingers when placing the culvert pipe cover on top of pipe.

Conventional headwalls have a bottom surface (foundation) that extends beyond the pipe end and wings that flare out from the pipe end sides, supporting the wall and preventing tip-over. The presently disclosed culvert pipe cover may not require such features since it is supported and removably fixed to the pipe itself. Subsequently, conventional headwalls require relatively complex three dimensional concrete forms to produce. Without the bottom surface extender and wings of the conventional headwall, the presently disclosed culvert pipe cover may be poured in a simple concrete form, open on the front face, and able to be finished with different textures on the front face.

The undersurface of the top arch of presently disclosed culvert pipe cover, that rests on top of the pipe, may have two flat surfaces that intersect at an obtuse angle. In this aspect having an angular top arch, the culvert pipe cover may be placed on top of the pipe end and two flat surfaces may provide two points, or areas, of contact with the pipe, providing stability. Conventional headwalls feature a circular undersurface instead of two intersecting flat surfaces. A conventional headwall having a circular surface providing only a single point or area of contact, may not provide desired stability.

There is thus provided a pipe cover and method of covering a pipe. One feature or aspect of an illustrative example is believed at the time of the filing of this patent application to possibly reside broadly in a pipe cover comprising: a cover having a first side, top, second side and an open bottom; the cover being configured to receive an end portion of a pipe into the open bottom and between the first and second side; the first side, top, and second side being configured and disposed to extend beyond a terminal end of the pipe to be covered, upon receipt of the pipe in the open bottom; a first clamping mechanism on the first side and a second clamping mechanism on the second side; the first and second clamping mechanisms being configured and disposed to clamp the cover onto the end portion of the pipe to be covered and cover the terminal end of the pipe.

Another feature or aspect of an illustrative example is believed at the time of the filing of this patent application to possibly reside broadly in the pipe cover wherein the first side, top, and second side have a first inner perimeter and a second inner perimeter, the first inner perimeter having a dimension greater than an outer perimeter of the pipe to be covered and being configured to receive the end portion of the pipe, the second inner perimeter being less than the first inner perimeter.

Still another feature or aspect of an illustrative example is believed at the time of the filing of this patent application to possibly reside broadly in the pipe cover, wherein the second inner perimeter is less than a, to be covered, outer perimeter of the pipe.

A further feature or aspect of an illustrative example is believed at the time of the filing of this patent application to possibly reside broadly in the pipe cover, wherein the first clamping mechanism has a first clamping control and a first clamping block and the second clamping mechanism has a second clamping control and a second clamping block, the clamping controls being configured to move the clamping blocks toward each other and clamp onto the end portion of the pipe.

Another feature or aspect of an illustrative example is believed at the time of the filing of this patent application to possibly reside broadly in the pipe cover, wherein the first clamping control is accessible from an outer surface of the first side and the second clamping control is accessible from an outer surface of the second side.

Yet another feature or aspect of an illustrative example is believed at the time of the filing of this patent application to possibly reside broadly in the pipe cover, wherein the first and the second clamping controls each comprise a threaded bolt extending through apertures in the sides with a head accessible from the outer surfaces of the sides.

Still another feature or aspect of an illustrative example is believed at the time of the filing of this patent application to possibly reside broadly in the pipe cover, wherein the first and the second clamping blocks each comprise a threaded inner portion configured to receive the threaded bolts and move toward each other upon rotation of the heads of the threaded bolts.

A further feature or aspect of an illustrative example is believed at the time of the filing of this patent application to possibly reside broadly in the pipe cover, wherein the first and the second clamping mechanisms each have a stop on the threaded bolt configured to stop movement of the threaded bolts out of the apertures.

Another feature or aspect of an illustrative example is believed at the time of the filing of this patent application to possibly reside broadly in the pipe cover, wherein the first and the second clamping blocks have a non-planar surface configured to clamp and hold the end portion of the pipe therebetween.

Yet another feature or aspect of an illustrative example is believed at the time of the filing of this patent application to possibly reside broadly in the pipe cover, wherein the first clamping control, first clamping block, second clamping control, and second clamping block all have the same longitudinal axis.

One feature or aspect of an illustrative example is believed at the time of the filing of this patent application to possibly reside broadly in the pipe cover, wherein a length of an inner surface of the first side and a length of the inner surface of the second side are equal to each other and are less than a diameter of the pipe to be covered.

Another feature or aspect of an illustrative example is believed at the time of the filing of this patent application to possibly reside broadly in the pipe cover, wherein the first clamping mechanism and the second mechanism are configured and disposed to clamp the pipe to be covered below a center point of the pipe.

Yet another feature or aspect of an illustrative example is believed at the time of the filing of this patent application to possibly reside broadly in the pipe cover, wherein an inner surface of the top is non-planar, curved, or angular.

Still another feature or aspect of an illustrative example is believed at the time of the filing of this patent application to possibly reside broadly in a method for covering an end of a pipe comprising the steps of: placing a pipe cover over a terminal end of a pipe, the pipe cover having a first side, a top, a second side and an open bottom; covering a top and portions of sides of a terminal end of the pipe, with the first side, the top, and the second side of the pipe cover, and leaving a lower portion of the pipe uncovered; and clamping the first and the second sides of the pipe cover onto the pipe.

A further feature or aspect of an illustrative example is believed at the time of the filing of this patent application to possibly reside broadly in the method for covering an end of a pipe, wherein the step of placing a pipe cover over a terminal end of a pipe comprises suspending the pipe cover on the pipe.

Another feature or aspect of an illustrative example is believed at the time of the filing of this patent application to possibly reside broadly in the method for covering an end of a pipe of claim 14, wherein the step of clamping the first and the second sides of the pipe cover onto the pipe comprises clamping the pipe below center of the pipe.

Yet another feature or aspect of an illustrative example is believed at the time of the filing of this patent application to possibly reside broadly in the method for covering an end of a pipe further comprises holding the pipe cover on the end of the pipe with at least one non-planar friction surface.

Still another feature or aspect of an illustrative example is believed at the time of the filing of this patent application to possibly reside broadly in the method for covering an end of a pipe further comprising covering a portion of an exit of the pipe.

A further feature or aspect of an illustrative example is believed at the time of the filing of this patent application to possibly reside broadly in the method for covering an end of a pipe, wherein the step of clamping the first and the second sides of the pipe cover onto the pipe comprises activating clamping controls on the first and second sides of the pipe cover.

One feature or aspect of an illustrative example is believed at the time of the filing of this patent application to possibly reside broadly in the method for covering an end of a pipe, wherein the activating of the clamping controls comprises rotating a bolt head on the first and second sides of the pipe cover.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

AT LEAST PARTIAL NOMENCLATURE pipe cover 10
cover 100
first side 102
top 104
second side 106
open bottom 108
end portion of a culvert pipe 110
first clamping mechanism 112
second clamping mechanism 114
aperture in side 115
first inner perimeter 116
second inner perimeter 118
first clamping control 120
first clamping block 122
sleeve 124
second clamping control 126
second clamping block 128
threaded bolt 130
head 132
head 133
threaded inner portion 134
stop 136
non-planar surface 138
hand hold 140
Contact surface 142
friction surface 144
washer 146
clamping mechanism 212
clamping block 222
sleeve 224
threaded bolt 230
head 232
nut 236
non-planar surface 238
washer 246
support 247
clamping axis A
wall inner width $W_i$
wall outer width $W_o$
first side clamping block length L1
second side clamping block length L2

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A pipe cover comprising:
    a cover having a first side, top, second side and an open bottom;
    the cover being configured to receive an end portion of a pipe into the open bottom and between the first and second side;
    the first side, top, and second side being configured and disposed to extend beyond a terminal end of the pipe to be covered, upon receipt of the pipe in the open bottom;
    wherein the first side, the top, and the second side have a first inner perimeter and a second inner perimeter, the first inner perimeter having a dimension greater than an outer perimeter of the pipe to be covered and being configured to receive the end portion of the pipe, the second inner perimeter being less than the first inner perimeter, thus configuring the pipe cover to cover a range of sizes of pipe and damaged pipe;
    a first clamping mechanism on the first side and a second clamping mechanism on the second side;
    wherein the first clamping mechanism has a first clamping control and a first clamping block and the second clamping mechanism has a second clamping control and a second clamping block, the clamping controls being configured to move the clamping blocks toward each other and perpendicular to a longitudinal axis of the pipe and clamp onto an outer surface of the end portion of the pipe; and
    wherein the pipe cover is configured to cover the terminal end of the pipe and shield the covered end portion and the covered terminal end of the pipe from view.

2. The pipe cover of claim 1, wherein the second inner perimeter is less than an outer perimeter of the portion of the pipe to be covered.

3. The pipe cover of claim 1, wherein the first clamping control is accessible from an outer surface of the first side and the second clamping control is accessible from an outer surface of the second side.

4. The pipe cover of claim 3, wherein the first and the second clamping controls each comprise a threaded bolt extending through apertures in the sides with a head accessible from the outer surfaces of the sides.

5. The pipe cover of claim 4, wherein the first and the second clamping blocks each comprise a threaded inner portion configured to receive the threaded bolts and move toward each other upon rotation of the heads of the threaded bolts.

6. The pipe cover of claim 5, wherein the first and the second clamping mechanisms each have a stop on the threaded bolt configured to stop movement of the threaded bolts out of the apertures.

7. The pipe cover of claim 6, wherein the first and the second clamping blocks have a non-planar surface configured to clamp and hold the end portion of the pipe therebetween.

8. The pipe cover of claim 7, wherein the first clamping control, first clamping block, second clamping control, and second clamping block all have the same longitudinal axis.

9. The pipe cover of claim 1, wherein a length of an inner surface of the first side and a length of the inner surface of the second side are equal to each other and are less than a diameter of the pipe to be covered.

10. The pipe cover of claim 9, wherein the first clamping mechanism and the second mechanism are configured and disposed to clamp the pipe to be covered below a center point of the pipe.

11. The pipe cover of claim 10, wherein an inner surface of the top is non-planar, curved, or angular.

12. A method for covering an end of a pipe comprising the steps of:
    placing a pipe cover over a terminal end of the pipe, the pipe cover having a first side, a top, a second side and an open bottom;
    covering a top and portions of sides of a terminal end of the pipe and shielding the covered terminal end portions of the pipe from view, with the first side, the top, and the second side of the pipe cover, and leaving a lower portion of the pipe uncovered; and
    clamping the first and the second sides of the pipe cover onto the pipe.

13. The method for covering an end of a pipe of claim 12, wherein the step of placing a pipe cover over a terminal end of a pipe comprises suspending the pipe cover on the pipe.

14. The method for covering an end of a pipe of claim 12, wherein the step of clamping the first and the second sides of the pipe cover onto the pipe comprises clamping the pipe below center of the pipe.

15. The method for covering an end of a pipe of claim 12, further comprises holding the pipe cover on the end of the pipe with at least one non-planar friction surface.

16. The method for covering an end of a pipe of claim 12, further comprising covering a portion of an exit of the pipe.

17. The method for covering an end of a pipe of claim 12, wherein the step of clamping the first and the second sides of the pipe cover onto the pipe comprises activating clamping controls on the first and second sides of the pipe cover.

18. The method for covering an end of a pipe of claim 17, wherein the activating of the clamping controls comprises rotating a bolt head on the first and second sides of the pipe cover.

* * * * *